US007903056B2

(12) United States Patent
Kawasaki et al.

(10) Patent No.: US 7,903,056 B2
(45) Date of Patent: Mar. 8, 2011

(54) VOLTAGE-CURRENT CONVERTING METHOD, VOLTAGE-CURRENT CONVERTING CIRCUIT AND ACTIVE MATRIX TYPE DISPLAY APPARATUS

(75) Inventors: Somei Kawasaki, Saitama (JP); Takanori Yamashita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 922 days.

(21) Appl. No.: 11/770,144

(22) Filed: Jun. 28, 2007

(65) Prior Publication Data

US 2008/0042944 A1 Feb. 21, 2008

(30) Foreign Application Priority Data

Jun. 30, 2006 (JP) ................................ 2006-181668

(51) Int. Cl.

| | |
|---|---|
| ***G09G 3/12*** | (2006.01) |
| ***G09G 3/30*** | (2006.01) |
| ***G09G 5/00*** | (2006.01) |
| ***G09G 5/10*** | (2006.01) |
| ***G06F 3/038*** | (2006.01) |

(52) U.S. Cl. ............... 345/77; 345/36; 345/45; 345/204; 345/690; 327/103

(58) Field of Classification Search .................... 345/36, 345/44–46, 76–77, 82, 87–102, 204, 211, 345/690; 327/103

See application file for complete search history.

(56) References Cited

U.S. PATENT DOCUMENTS

| | | | | |
|---|---|---|---|---|
| 6,229,506 | B1 * | 5/2001 | Dawson et al. | 345/82 |
| 6,927,618 | B2 * | 8/2005 | Kimura et al. | 327/427 |
| 7,126,564 | B2 | 10/2006 | Schach et al. | 345/75.1 |
| 7,126,565 | B2 * | 10/2006 | Kawasaki et al. | 345/76 |
| 7,342,560 | B2 * | 3/2008 | Yuki et al. | 345/82 |
| 7,532,209 | B2 * | 5/2009 | Kimura | 345/205 |
| 2004/0046719 | A1 * | 3/2004 | Wang et al. | 345/82 |
| 2007/0035340 | A1 * | 2/2007 | Kimura | 327/524 |
| 2007/0085847 | A1 * | 4/2007 | Shishido | 345/204 |
| 2008/0007499 | A1 * | 1/2008 | Kawabe | 345/82 |

* cited by examiner

*Primary Examiner* — Bipin Shalwala
*Assistant Examiner* — Matthew A Fry
(74) *Attorney, Agent, or Firm* — Fitzpatrick, Cella, Harper & Scinto

(57) ABSTRACT

A voltage-current converting converts a voltage signal into a current signal. In an example operation, a source of a transistor is connected to a first power source, the source is connected to an input terminal via a coupling capacitor, and a gate and a drain of the transistor are connected to a second power source so that current flows between the source and the drain while a constant voltage is applied to the input terminal. To output the current signal, the drain is disconnected from the second power source, the voltage signal is supplied from the input terminal to the holding capacitor via the coupling capacitor, the coupling capacitor is disconnected from the input terminal, the gate is disconnected from the second power source, the drain is connected to the second power source, and the source is connected to an output terminal.

7 Claims, 14 Drawing Sheets

VOLTAGE-CURRENT CONVERTING METHOD, VOLTAGE-CURRENT CONVERTING CIRCUIT AND ACTIVE MATRIX TYPE DISPLAY APPARATUS

BACKGROUND OF THE INVENTION

1. Field of the Invention

The present invention relates to a voltage-current converting method and a voltage-current converting circuit. In particular, the present invention relates to an active matrix type display apparatus using a current drive type display device and a current programming type pixel circuit, and a voltage-current converting method of the display apparatus.

2. Description of the Related Art

In recent years, self-luminous type displays using light emitting devices have been watched as next generation displays. Among them, the application and the development of an organic electroluminescence (EL) device, which is a current control type light emitting device, the light emission luminance of which is controlled by the current flowing through the element, have been actively performed. An organic EL display including the peripheral circuitry thereof uses thin film transistors (TFTs) not only in the display area thereof but also in the peripheral circuitry. A conventional image display panel (hereinafter referred to as an EL panel) that applies EL elements, which are such self-luminous elements, as image display elements and uses the TFTs in the display area thereof and the peripheral circuitry thereof will be described with reference to the attached drawings.

FIG. 12 illustrates an example of the configuration of an EL panel including conventional current setting system pixel circuits.

In an EL panel 100 illustrated in FIG. 12, a pixel display unit 9 and the peripheral circuitry thereof are arranged. In the pixel display unit 9, EL elements, the number of which is equal to the number of R, G, B primary colors, and pixel circuits 2 composed of TFTs for controlling the currents input into the EL elements are two-dimensionally arranged in a matrix of N columns by M rows. A horizontal scanning control signal 11*a* is input from the outside into an input circuit 6 in the peripheral circuitry. Moreover, a vertical scanning control signal 12*a* is input from the outside into an input circuit 7. Furthermore, an auxiliary column control signal 13*a* is input from the outside into an input circuit 8.

A horizontal scanning control signal 11 (including a horizontal clock signal and a horizontal scanning start signal) converted by the input circuit 6 is input into a column shift register 3. Moreover, a vertical scanning control signal 12 converted by the input circuit 7 is input into a row shift register 5. A row scanning signal 20 output from each output terminal of the row shift register 5 is input into the pixel circuits 2 on each row through a scanning line.

Moreover, an auxiliary column control signal 13 converted by the input circuit 8 is input into each of gate circuits 4 and 16. A first horizontal sampling signal 17 output from each terminal of the column shift register 3 is input into a horizontal sampling signal gate circuit 15 together with a control signal 21 converted by the gate circuit 16. A second horizontal sampling signal 18 converted by the horizontal sampling signal gate circuit 15 is input into column current generation circuits (also referred to as "column current control circuits" or "column control circuits") 1 together with a video signal (voltage signal) 10 input from the outside and a control signal 19 converted by the gate circuit 4. A column control signal 14, which is a current signal converted from a video signal by the column current generation circuit 1, is input into the pixel circuit 2 of each column through a data line.

The plurality of column current generation circuits 1 are arranged according to the number of primary colors of each column of the pixel circuits 2, and are configured to cope with each number of primary colors of the input video signal 10. Each of the column current generation circuits 1 is configured by using a voltage-current converting circuit converting a dot sequential voltage video signal into a line sequential current video signal by the line.

FIG. 13 illustrates an example of the configuration of a voltage-current converting circuit constituting the column current generation circuit 1 described in U.S. Pat. No. 7,126,565. Incidentally, a gate, a source, and a drain of a transistor will be denoted by brevity codes of /G, /S, and /D, respectively, and a signal and a signal line for supplying the signal will be similarly represented without distinguishing them as the occasion demands in the following description. Transistors M5 and M12 among transistors M1-M12, which are TFTs, are p-channel TFTs (PMOSs) and the other transistors are n-channel TFTs (NMOSs). The transistors M3 and M9 are column current generating drive transistors (NMOS current drive transistors).

A video signal video, sampling signals SPa and SPb, and control signals P1-P6, each of which constitutes the control signal 19, are input into the column current generation circuit 1 illustrated in FIG. 13. The video signal video is connected to the M1/S and the M7/S, and the sampling signals SPa and sampling signal SPb are connected to the M1/G and M7/G, respectively. The M1/D is connected to a capacitor C1, and the other end of the capacitor C1 is connected to a capacitor C2, one end of which is grounded, and the transistor M3/G, the source of which is grounded. The M3/D and the M3/G are connected to the M2/D and the M2/S, respectively, and the control signal P1 is connected to the M2/G. The M3/D is connected the M4/S; the M4/D is connected to the short-circuited gate and drain of the transistor M5, the source of which is connected to a power source voltage VCC; and the M4/G is connected to the control signal P2. Furthermore, the M3/D is connected to the M6/S; the M6/D is connected to a terminal from which a current signal i (data) is output; and the M6/G is connected to the control signal P3. On the other hand, the M7/D is connected to a capacitor C3, and the other end of the capacitor C3 is connected to a capacitor C4, one end of which is grounded, and the gate of the transistor M9, the source of which is grounded. The M9/D and the M9/G are connected to the M8/D and the M8/S, respectively, and the control signal P4 is connected to the M8/G. The M9/D is connected to the M11/S; the M11/D is connected to the short-circuited gate and drain of the transistor M12, the source of which is connected to the power source voltage VCC; and the M11/G is connected to the control signal P5. Furthermore, the M9/D is connected to the M10/S; the M10/D is connected to the terminal outputting the current signal i (data); and the M10/G is connected to the control signal P6.

FIG. 14 is a time chart for describing the operation of the column current generation circuit 1 illustrated in FIG. 13. FIG. 14 illustrates the operation for three horizontal scanning periods of a video signal, or for three lines of the EL panel.

First, just before a time t1, each of the sampling signals SPa and SPb is the L level, and the control signals P1-P6 are L, L, H, L, H, and L levels, respectively. Each of the transistors M1, M2, M4, M6, M7, M8, M11, and M10, which perform switching operations, are in the following state: M1=OFF, M2=OFF, M4=OFF, M6=ON, M7=OFF, M8=OFF, M11=ON, and M10=OFF, respectively. At this time, the transistors M3 and M9 are current-driven by holding voltages Va1 and Vb1 charged in the capacitor attended to each of their gate electrodes, respectively. That is, the current Ia1 of the M3/D is output as the current signal i (data), and becomes the column control signal 14. The current of the M9/D is supplied to the transistor M12, and the voltage of the M9/D is determined.

Next, at the time t1, the input video signal video is at the blanking level Vb1. At this time point, the sampling signal SPa, and the control signals P2, P3, P5, and P6 change to the H, H, L, L, and H levels, respectively. Consequently, each of the transistors M1, M2, M4, M6, M7, M8, M11, and M10, which perform switching operations, are in the following state: M1=ON, M2=OFF, M4=ON, M6=OFF, M7=OFF, M8=OFF, M11=OFF, and M10=ON, respectively. At this time, as the current signal i (data), the current Ib1 of the M9/D driven by the voltage Vb1 of the M9/G is output in the place of the current Ia1 of the M3/D. Before a time t2, the control signal P1 changes to the H level, and the transistor M2 turns to ON. The M3/G is charged by the transistor M5 in a short period of time from this time point to a time t2.

Next, at the time t2, the charging operation of the M3/G by the transistor M5 stops, and the M3/G performs a self-discharge operation it gradually approaches its own threshold voltage Vth. Next, at a time t3, the sampling signal SPa changes to the L level, and the transistor M1 turns to OFF. Before a time t4, the control signal P1 changes to the L level, and the transistor M2 turns OFF. Then, the self-discharge operation of the transistor M3 ends at this time point. During the period from this time point to the time t4, both the transistors M2 and M4 turn OFF, and the M3/D quickly changes to be at the L level. Consequently, the voltage of the M3/G somewhat drops owing to the drain-to-gate capacitor of the transistor M3 and the like as illustrated in FIG. 14.

Next, at the time t4 when the control signal P2 changes to the H level, the transistor M4 turns ON, and the M3/D again rises. Consequently, the voltage of the M3/G again rises to return to the almost original state as illustrated in FIG. 14. At this time point, because the voltage of the M3/G is a voltage Vrsa in the neighborhood of its own threshold voltage Vth, the current of the M3/D is almost zero. In an effective period of the video signal video from the time t1 to a time t7, the sampling signal SPa, which is a horizontal sampling signal group, is generated, but the sampling signal SPb is not generated.

Next, in a period of from a time t5 to a time t6, by the horizontal sampling signal SPa of a column corresponding to the period, the voltage of the M3/G changes from the voltage Vrsa in the neighborhood of its own threshold value Vth by a voltage AV1 according to a video signal level d1 based on the blanking level Vb1. The voltage AV1 can be roughly expressed by AV1=d1×C1/(C1+C2+C(M3)). The C(M3) denotes gate input capacitor of the transistor M3. At this time, the drive current Id of the transistor M3 is expressed by: $Id=\beta\times\Delta V^2$ (where β denotes a drive coefficient, and ΔV=Vgs−Vth). After that, when the corresponding sampling signal SPa changes to the L level, the transistor M1 turns OFF, and the voltage of the M3/G changes to the voltage Va2, which somewhat drops owing to the parasitic capacitor operation of the transistor M1, and the voltage again becomes the held state.

After shifting to the next horizontal scanning period, at the time t7, the input video signal video has become the blanking level Vb1, and the sampling signal SPb and the control signals P2, P3, P5, and P6 change to the H, L, H, H, and L levels, respectively. A drive current Ia2 of the transistor M3 driven by the voltage Va2 of the M3/G is output as the current signal i (data) in place of the current Ib1 of the M9/D.

In a period of from that time to a time t13, a voltage Vb2 of the M9/G, which voltage Vb2 is increased from a voltage (Vrsb) in the neighborhood of the own threshold voltage Vth by a voltage ΔV2 corresponding to a video signal level d2 based on the blanking level Vb1, is sampled and held by the operation similar to the one mentioned above. And then at the time t13, the current signal i (data) is changed from the drive current Ia2 of the transistor M3 mentioned above to a drive current Ib2 of the transistor M9, which drive current Ib2 is driven by the voltage Vb2 of the M9/G.

When the operation has shifted to the further next horizontal scanning period, after the time t13 on, a voltage Va3 of the M9/G, which voltage Va3 is increased from a voltage (Vrsa) in the neighborhood of the own threshold voltage Vth by a voltage ΔV3 corresponding to a video signal level d3 based on the blanking level, is sampled and held by the operation similar to the one mentioned above.

However, because the aforesaid column current generation circuit used in the conventional display apparatus uses NMOS transistors as current drive transistors for the generation of column currents, characteristic variations of their voltage-current converting characteristics among elements are larger in comparison with those of PMOS transistors. In particular, the variations of the drive currents Id caused by the drive coefficient β among the voltage-current converting characteristics expressed by the formula $Id=\beta\times(Vgs-Vth)^2$ are not settled by the conventional circuits, such as the column current generation circuit 1 disclosed in the U.S. Pat. No. 7,126,564 mentioned above. Consequently, current values supplied to EL elements vary every column of pixel circuits, and then the light emission luminance of the EL elements varies every column. In the worst case, the variations appear as vertical line noises on a display area, and the vertical line noises are one of the primary factors of image quality deteriorations. Consequently, the settlement of the variations of the current values has been desired.

SUMMARY OF THE INVENTION

It is an object of the present invention to suppress the changes of drive currents owing to the variations of the characteristics of current drive transistors for the generation of column currents, and to decrease vertical line noises in a display area for improving an image quality.

In order to achieve the object mentioned above, the present invention is first a voltage-current converting method converting an input voltage signal into a current signal and outputting the current signal, the method comprising the steps of: connecting a source of a PMOS transistor to a first power source and to a signal input terminal via a coupling capacitor and connecting a gate thereof and a drain thereof to a second power source to flow a current between the source and the drain of the PMOS transistor while a constant voltage being applied to the signal input terminal, thereby charging a holding capacitor connected between the gate and the source of the PMOS transistor; disconnecting the source of the PMOS transistor from the first power source, thereby discharging the holding capacitor through the PMOS transistor; disconnecting the drain of the PMOS transistor from the second power source and supplying the input voltage signal from the signal input terminal to the holding capacitor via the coupling capacitor; and disconnecting the coupling capacitor from the signal input terminal and the gate of the PMOS transistor from the second power source, connecting the drain of the PMOS transistor to the second power source the source thereof to an output terminal, thereby outputting the current signal.

Moreover, the present invention is second voltage-current converting circuit converting an input voltage signal into a current signal and outputting the current signal, the circuit comprising: a PMOS transistor, a coupling capacitor connected between a signal input terminal and a source of the PMOS transistor a holding capacitor connected between a gate and the source of the PMOS transistor; a first switching element connecting an input terminal of the voltage signal to the coupling capacitor; a second switching element connecting the source of the PMOS transistor to a first power source; a third switching element connecting a drain of the PMOS transistor to a second power source; a fourth switching element connecting the source of the PMOS transistor to an output terminal of the current signal; and a fifth switching element connecting the gate of the PMOS transistor to the second power source.

The present invention is third an active matrix type display apparatus comprising: a plurality of two-dimensionally arranged display elements to be driven according to input currents; a plurality of pixel circuits supplying the currents to the plurality of display elements to drive the display elements; signal lines for supplying the currents to the plurality of pixel circuits every column; and column current generation circuits outputting the currents to the signal lines according to input voltage signals, wherein each of the column current generation circuits includes: a PMOS transistor, a coupling capacitor connected between a voltage signal input terminal and a source of the PMOS transistor, a holding capacitor connected between a gate and the source of the PMOS transistor; a first switching element connecting the voltage signal input terminal to the coupling capacitor; a second switching element connecting the source of the PMOS transistor to a first power source; a third switching element connecting a drain of the PMOS transistor to a second power source; a fourth switching element connecting the source of the PMOS transistor to one of the signal lines; and a fifth switching element connecting the gate of the PMOS transistor to the second power source.

The display elements may be electroluminescence elements.

According to the present invention, the changes of drive currents caused by the characteristic variations of the current drive transistors for the generation of a column current can be suppressed, and the vertical line noises in a display area can be decreased to improve image quality.

The present invention is especially applied to an active matrix type display apparatus using a current drive type display device. By using the display apparatus, for example, an information display apparatus can be configured. The information display apparatus is formed in any of, for example, a portable telephone (or mobile phone), a portable computer, a still camera, and a video camera. Alternatively, the information display apparatus is an apparatus for realizing a plurality of functions of the apparatus mentioned above. The information display apparatus includes an information input unit. For example, the information input unit of the portable telephone is configured to include an antenna. In the case of a personal digital assistant (PDA) or a portable type personal computer, the information input unit is configured to include an interface unit to a network. In the case of the still camera or a movie camera, the information input unit is configured to include a sensor unit made of a CCD, a CMOS, or the like.

Further features of the present invention will become apparent from the following description of exemplary embodiments with reference to the attached drawings.

DESCRIPTION OF THE EMBODIMENTS

In the following, the exemplary embodiments for implementing an active matrix type display apparatus according to the present invention will be concretely described with reference to the attached drawings.

First, a conceptional point of the present invention will be described.

Figure 9A:
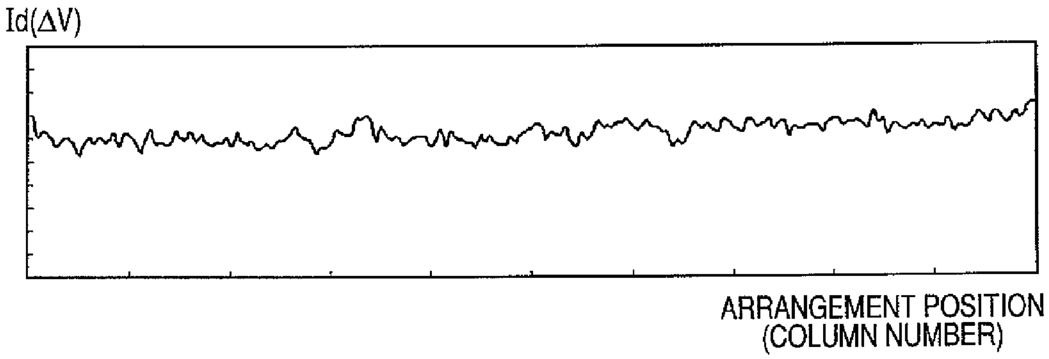
FIG. 9A is a graph for describing voltage-current conversion variations of an NMOS.
Figure 9B:
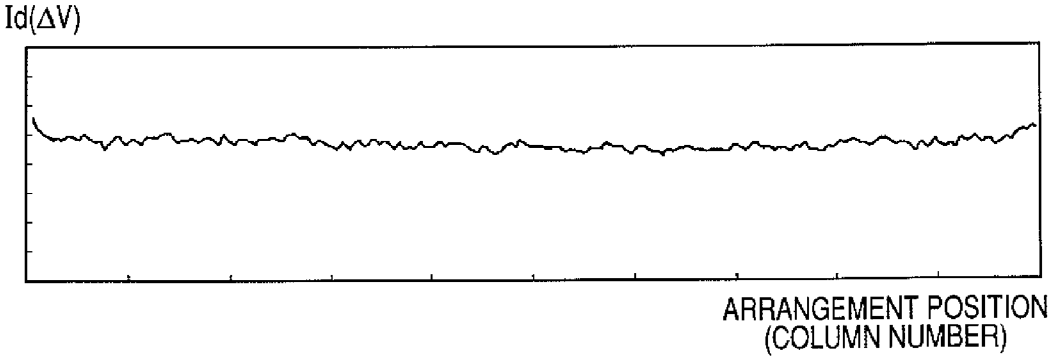
FIG. 9B is a graph for describing voltage-current conversion variations of a PMOS.
Figure 10:
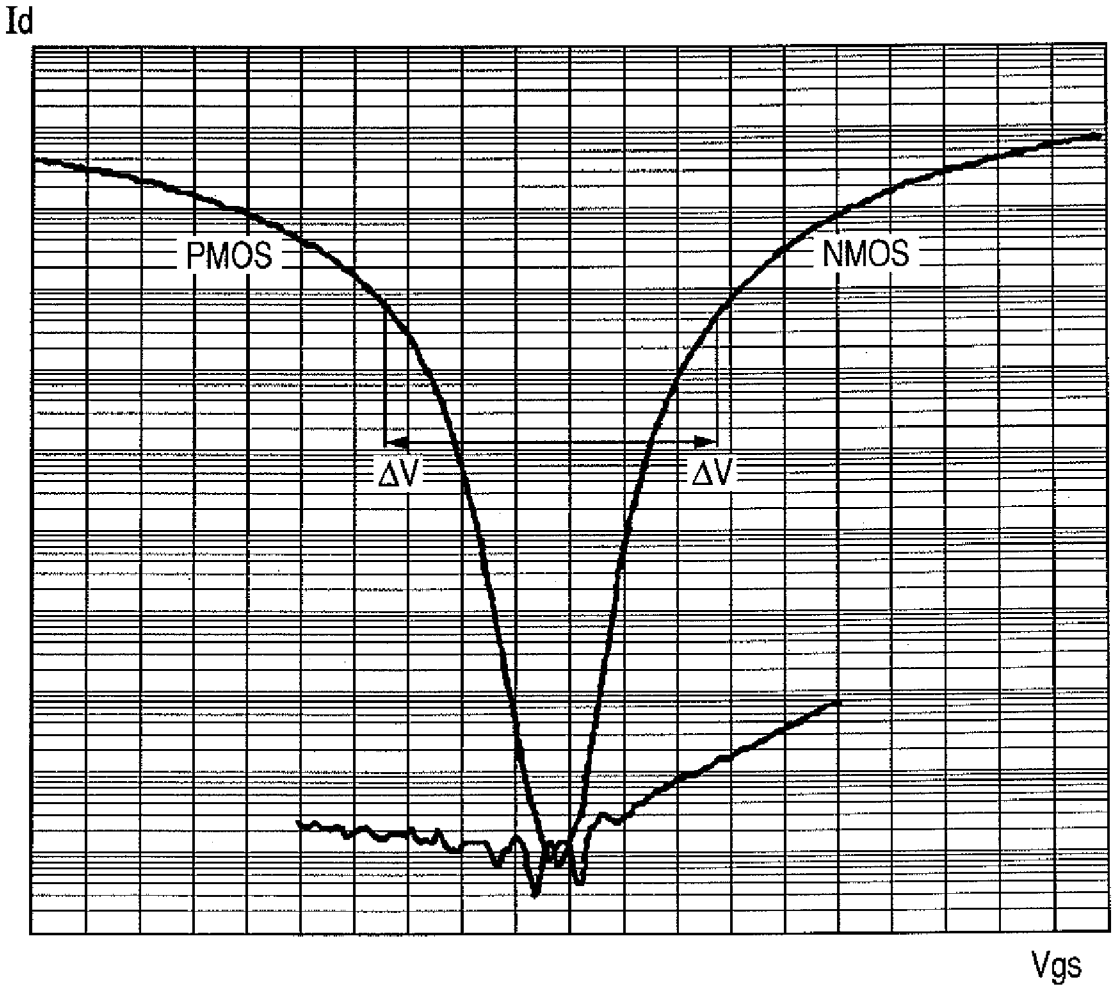
FIG. 10 is a graph for describing voltage-current conversion characteristics of transistors.

FIGS. 9A, 9B, and 10 are for describing voltage-current conversion characteristics of current drive transistors and their variations.

FIGS. 9A and 9B illustrate the cases of using an NMOS transistor and a PMOS transistor, respectively. The ordinate axes in the figures illustrate the drive currents (drain currents) Id ($\Delta V$) between sources and drains when voltages $\Delta V$ are applied between gates and the sources, and the abscissa axes illustrate arrangement positions (column numbers) in column directions of column current generation circuits. FIG. 10 illustrates the characteristics of the drain currents Id to the gate-to-source voltages Vgs of an NMOS transistor and a PMOS transistor.

From these figures, it is found that the change variations of the drive current Id of a PMOS transistor are smaller than those of an NMOS transistor, and that the voltage-current conversion characteristic of the PMOS transistor is superior to that of the NMOS transistor. The reason can be considered as follows. That is, it is supposed that the variation of the mobility of electrons, which determines the mobility of a NMOS transistor, is denoted by Δ1. The movements of holes, which are the carriers of a PMOS transistor, are achieved by the participation of the mobility of a plurality (N) of electrons. If the variation of the movement of each electron is supposed to be the same in the movement of a hole of the PMOS transistor, a square-root law can be applied to the movement, and the variations of the mobility of the PMOS transistor become the $1/\sqrt{N}$ of those of the NMOS transistor.

Accordingly, the present invention aims at the following points. First, 1) the current drive transistors of the column current generation circuits are composed of PMOS transistors, which have smaller characteristic variations. Next, 2) in order to operate the input video signals of the column current generation circuits in the positive polarity similarly to the configuration of the conventional NMOS drive current transistors, currents are programmed to the source sides of the PMOS drive current transistors. And then, 3) the transistors for switching (SW) of the column current generation circuits are adapted to be able to be composed of the NMOS transistors, which have fewer leaks, similarly to the configurations of the conventional NMOS drive transistors.

That is, the active matrix type display apparatus according to the present invention is basically configured to arrange predetermined signal lines and pixel circuits, both being for supplying a current to each of display elements arranged in two dimensions. In this configuration, a voltage is generated between the control electrode (gate) of a PMOS transistor and the main electrode (source) having higher electric potential according to an input video signal, and the generated voltage is held by a capacitor. Thereby, a current group (current signals) is generated from the main electrodes of the PMOS transistors having higher electric potential, and the current group is supplied to the signal line of each column.

In such a way, by adapting the column current generating drive transistors using the PMOS transistors having smaller characteristic variations to adapt a circuit configuration so that the circuit configuration may be positive polarity input and positive polarity output, the changes of the drive current Id can be suppressed, and the vertical line noises can be decreased to improve the image quality.

In the following, exemplary embodiments embodying the present invention will be described.

First Exemplary Embodiment

Figure 12:
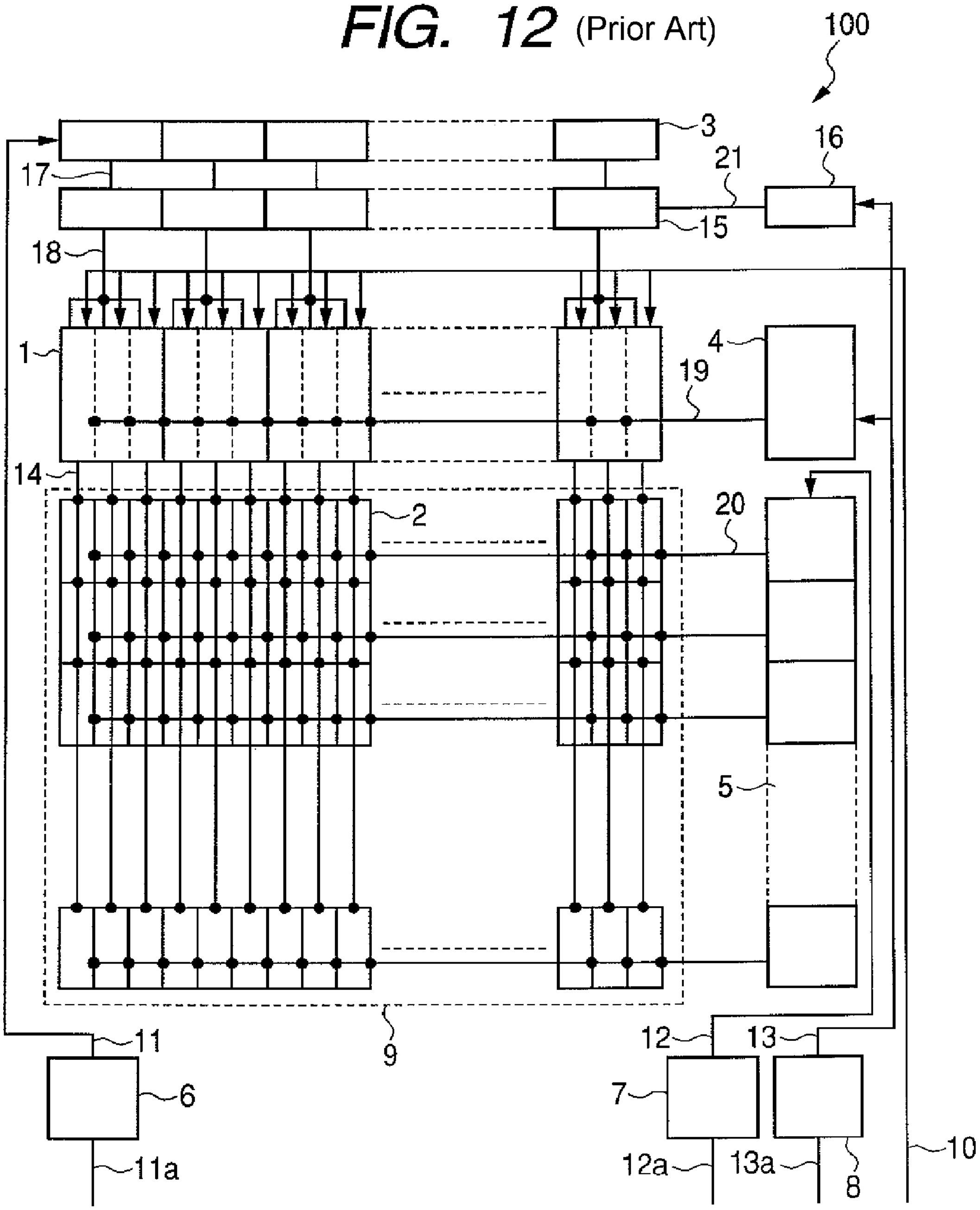
FIG. 12 (Prior Art)
FIG. 12 is a diagram illustrating the whole configuration of a conventional display apparatus.
Figure 13:
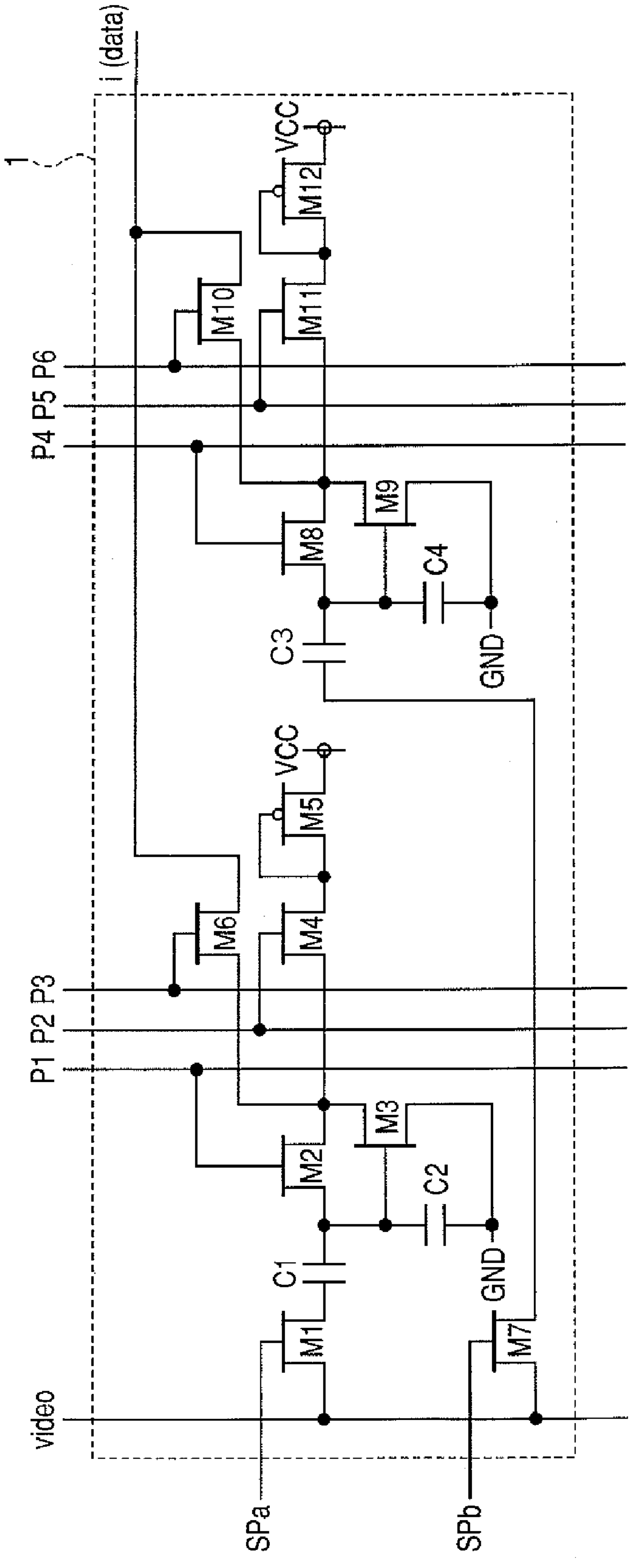
FIG. 13 (Prior Art)
FIG. 13 is a diagram illustrating the internal configuration of a conventional column current generation circuit.

The present exemplary embodiment is the one in which the present invention is applied to a column current generation circuit of an active matrix type display apparatus using EL elements. Because the whole configuration of the active matrix type display apparatus used for the present exemplary embodiment is the same as that of the prior art illustrated in FIG. 12, the description of the whole configuration is omitted.

Figure 1:
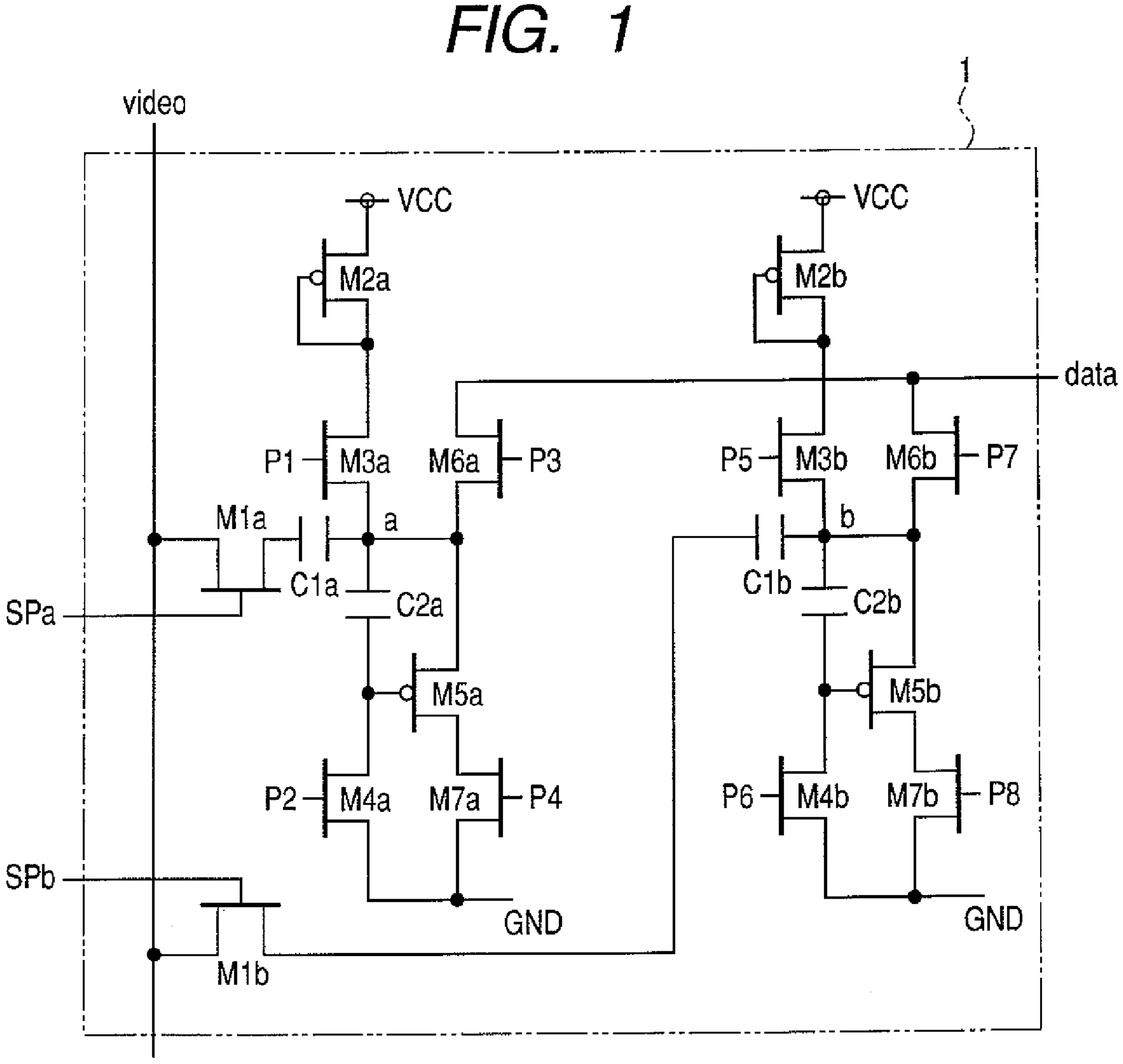
FIG. 1 is a circuit diagram illustrating the internal configuration of a column current generation circuit of a display apparatus according to a first exemplary embodiment of the present invention.

FIG. 1 illustrates the whole configuration of a column current generation circuit 1 of the present exemplary embodiment.

The column current generation circuit 1 illustrated in FIG. 1 is a current-voltage converting circuit receiving the input of a video signal video as an input voltage signal and converting the received video signal video into a current signal to alternately output from the sources of drive transistors M5*a* and M5*b* as a current signal.

The column current generation circuit 1 is composed of 2 systems of current converting circuits including connection points a and b, respectively, and each of the current converting circuits includes five NMOS transistors, that is, M1*a*, M3*a*, M4*a*, M6*a*, and M7*a*, and M1*b*, M3*b*, M4*b*, M6*b*, and M7*b*, and two PMOS transistors, that is, M2*a* and M5*a*, and M2*b* and M5*b*, respectively.

Each of the NMOS transistors M1*a*, M3*a*, M4*a*, M6*a*, M7*a*, M1*b*, M3*b*, M4*b*, M6*b*, and M7*b* is adapted to a switching (SW) transistor, which turns ON or OFF the current path between the source thereof and the drain thereof according to a control signal (of the L level or the H level) applied to the gate thereof. Each of the transistors M2*a* and M2*b* among the PMOS transistors M2*a*, M5*a*, M2*b*, and M5*b* is adapted to a transistor of a current source, the source and the drain of which are short-circuited to form a diode connection. Moreover, each of the transistors M5*a* and M5*b* is adapted to a current drive transistor, which generates a drain current (drive current) Id between the source thereof and the drain thereof according to a gate-to-source voltage Vgs applied to the gate thereof. As described above, the present exemplary embodiment uses the PMOS transistors M5*a* and M5*b* as the current drive transistors of the column current generation circuit 1.

Moreover, capacities C1*a* and C1*b* are coupling capacitor transmitting the signal line voltages of the video signal video to the sources of the current drive transistors M5*a* and M5*b*. Moreover, capacities C2*a* and C2*b* are holding capacities for regulating the gate-to-source voltages Vgs of the transistors M5*a* and M5*b*. The gate-to-source voltage Vgs of the transistor M5*a* corresponds to the electric potential at the connection point a between the capacities C1*a* and C2*a*, which electric potential is determined by the ratio of the capacitors C1*a* and C2*a*. Similarly, the gate-to-source voltage Vgs of the transistor M5*b* corresponds to the electric potential at the connection point b between the capacitors C1*b* and C2*b*, which electric potential is determined by the ratio of the capacitors C1*b* and C2*b*.

Moreover, the wiring of a pair of power sources, that is, the wiring of a first power source, a voltage VCC, and the wiring of a second power source, ground potential GND, is connected to the column current generation circuit 1. Moreover, the column current generation circuit 1 is connected to the signal line of the video signal video, the signal lines of the sampling signals SPa and SPb, the signal lines of the control signals P1-P8, and the signal line (data line) of a current signal data.

The signal line of the video signal video is connected to the sources of the transistors M1*a* and M1*b*, which are signal input terminals. The signal lines of the sampling signals SPa and SPb are connected to the gates of the transistors M1*a* and M1*b*, respectively, in parallel to each other. The signal lines of the control signals P1-P8 are connected to the gates of the transistors M3*a*, M4*a*, M6*a*, M7*a*, M3*b*, M4*b*, M6*b*, and M7*b*, respectively.

The drain of the transistor M1*a* is connected to one terminal of the capacitor C1*a*. The other terminal of the capacitor C1*a* is connected to the connection point a between the one terminal of the capacitor C2*a* and the source of the transistor M3*a* and a connection point between the sources of the transistors M6*a* and M5*a*. The drain of the transistor M3*a* is connected to the drain and the gate of the diode-connected transistor M2*a*. The source of the transistor M2*a* is connected to the wiring of the power source voltage VCC. The other terminal of the capacitor C2*a* is connected to the gate of the transistor M5*a* and the drain of the transistor M4*a*. The drain of the transistor M5*a* is connected to the drain of the transistor M7*a*. The sources of the transistors M4*a* and M7*a* are connected to the wiring of the ground potential GND. The drain of the transistor M6a is connected to the signal line of the current signal data.

Similarly, the drain of the transistor M1b is connected to one terminal of the capacitor C1b. The other terminal of the capacitor C1b is connected to the connection point b between one terminal of the capacitor C2b and the source of the transistor M3b and a connection point between the sources of the transistors M6b and M5b. The drain of the transistor M3b is connected to the drain and the gate of the diode-connected transistor M2b. The source of the transistor M2b is connected to the wiring of the power source voltage VCC. The other terminal of the capacitor C2b is connected to the gate of the transistor M5b and the drain of the transistor M4b. The drain of the transistor M5b is connected to the drain of the transistor M7b. The sources of the transistors M4b and M7b are connected to the wiring of the ground potential GND. The drain of the transistor M6b is connected to the signal line of the current signal data.

Figure 2:
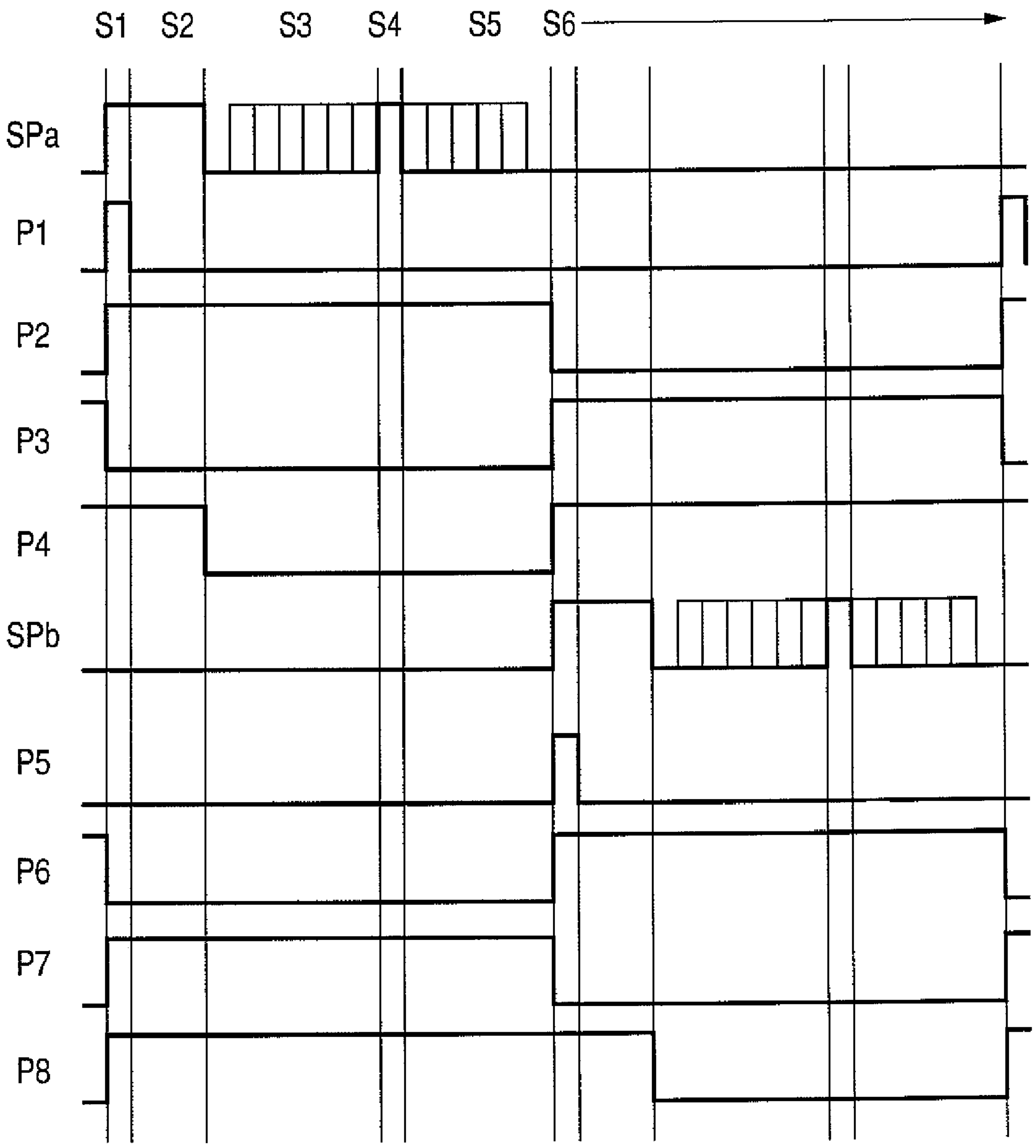
FIG. 2 is a timing chart for describing the operation of the column current generation circuit in the first exemplary embodiment.

FIG. 2 is a time chart for describing the operation of the column current generation circuit 1 of FIG. 1. FIG. 2 illustrates the operation for two horizontal scanning periods of a video signal, or for two lines of an EL panel. In the following description, the operation for one line of the EL panel of the operations for the two lines of the EL panel will be described.

Figure 14:
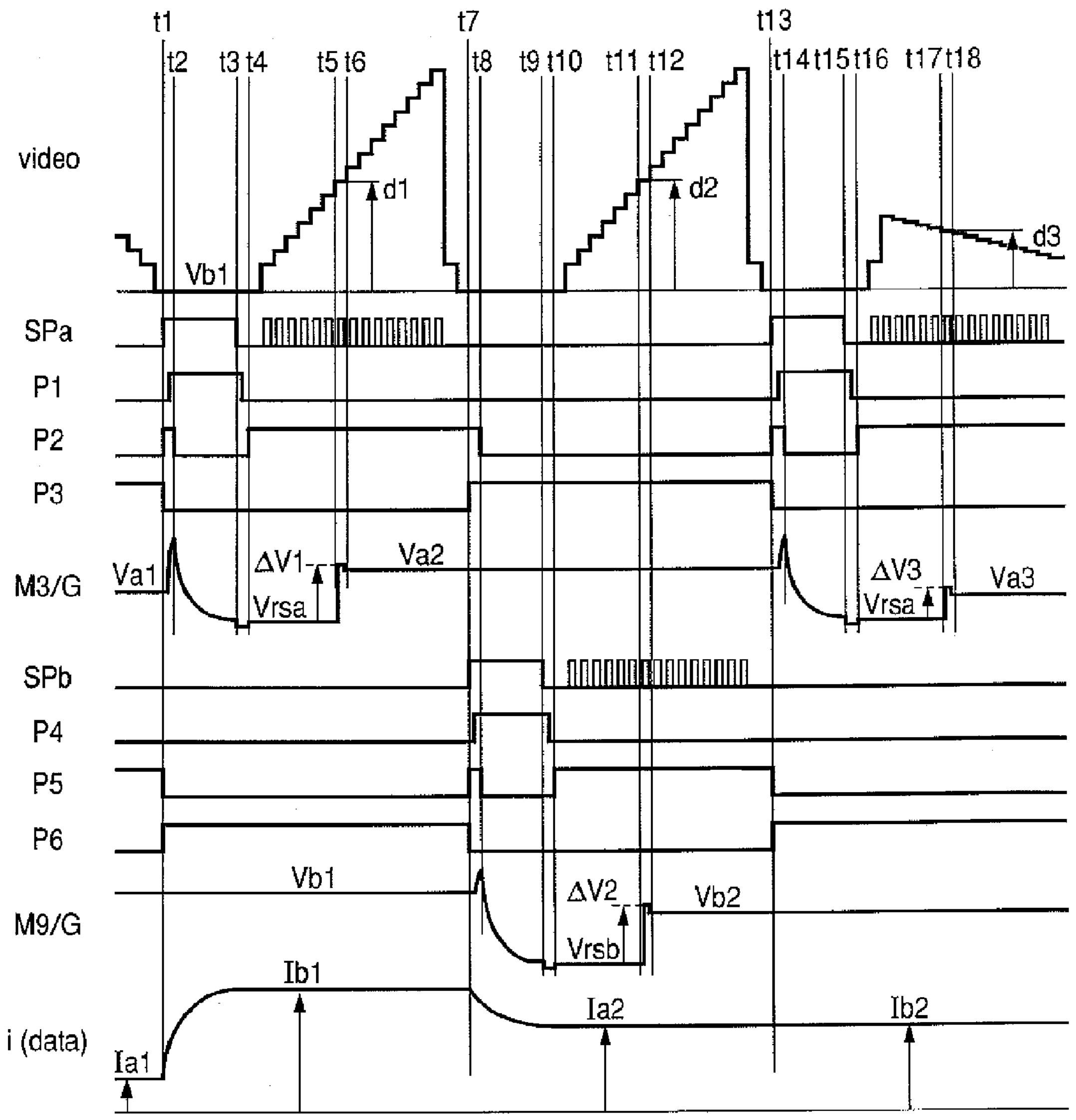
FIG. 14 (Prior Art)
FIG. 14 is a timing chart for describing the operation of the conventional column current generation circuit.

First, at a step S1, which is equivalent to the period between the times t1 and t2 of FIG. 14, the charging of the holding capacitor C2a is performed.

In the period at the step S1, a constant voltage as the video signal video is supplied. The constant voltage is a video voltage level in a blanking period.

The sampling signal SPa, the control signals P1, P2, P3, and P4 are the H, H, H, L, and H levels, respectively. Consequently, the SW transistors M1a, M3a, M4a, M6a, and M7a are ON, ON, ON, OFF, and ON, respectively.

At this time, because the transistor M1a is ON, the video voltage of the blanking period of the video signal video is supplied to the gate of the transistor M5a through the capacities C1a and C2a. Moreover, because the transistors M4a and M7a are ON, the gate and the drain of the transistor M5a are short-circuited with each other through the ground potential GND, and the diode connection of the transistor M5a is formed. Then, because the transistor M3a is ON, a current is supplied from the power source voltage VCC to the transistor M5a, which is in the state of the diode connection, through the diode-connected transistor M2a.

Figure 3:
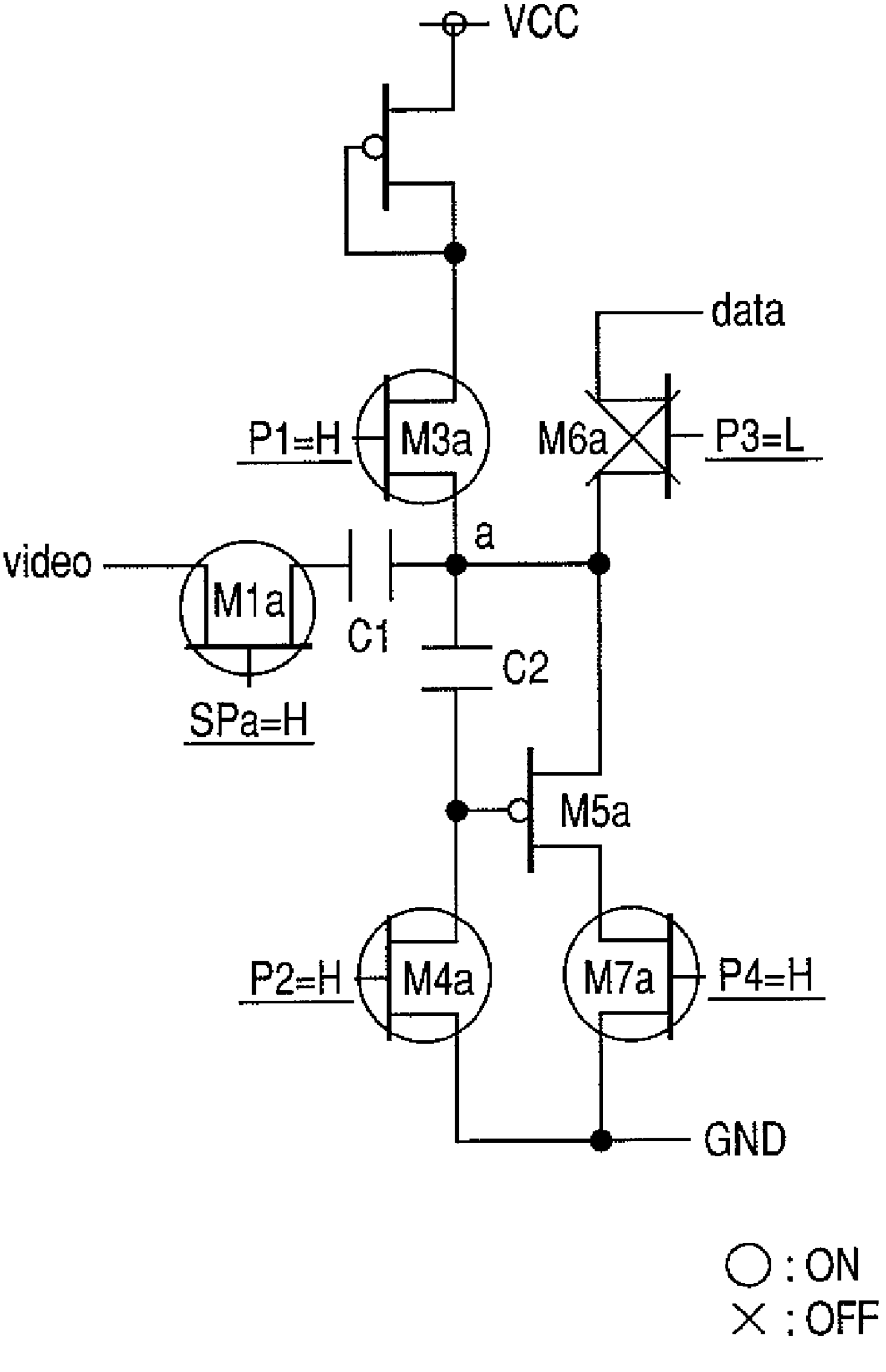
FIG. 3 is a circuit diagram for describing the ON/OFF states of the SW transistors at a step S1 (pre-charging period) of FIG. 2.

The capacities C1a and C2a are charged by the current, and the gate-to-source voltage Vgs of the transistor M5a rises. This state is illustrated in FIG. 3. The period is hereinafter referred to as a "pre-charging period." In the pre-charging period, because the transistor M6a is OFF, the drive current Id of the transistor M5a is not output to the signal line of the current signal data.

Next, at a step S2, which is equivalent to the period from the time t2 to the time t3 of FIG. 14, the charges of the holding capacitor C2a are discharged.

Figure 4:
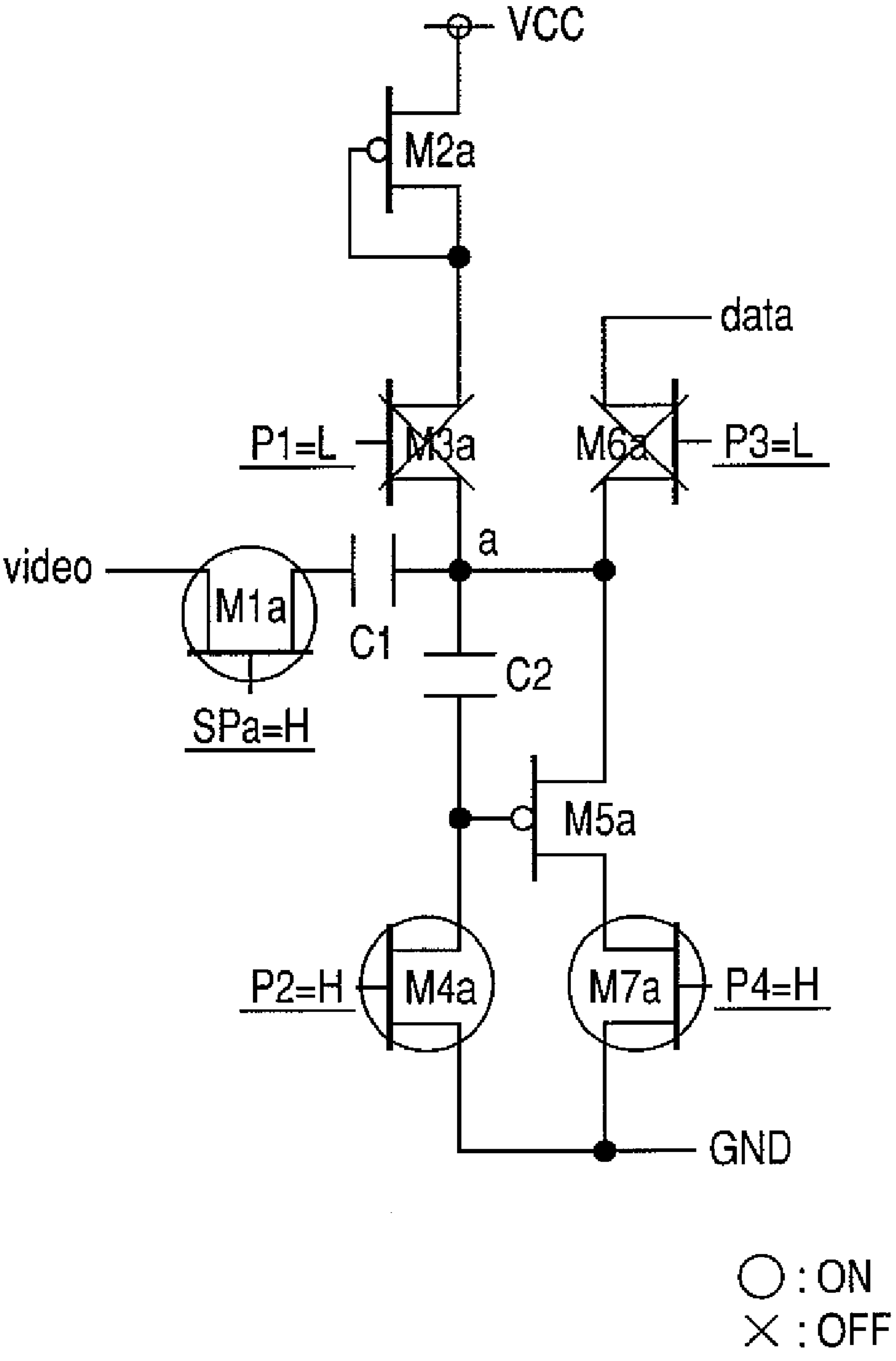
FIG. 4 is a circuit diagram for describing the ON/OFF states of the SW transistors at a step S2 (Vth reset period) in FIG. 2.

At the period of the step S2, the control signal P1 changes to the L level, and the transistor M3a turns OFF. The source of the transistor M5a is thereby separated from the power source voltage VCC, and the charging operations of the capacities C1a and C2a stop. Then, the operation of the self-discharge of the charges accumulated in the capacitor C2a through the transistor M5a is started. The discharge is performed until the gate-to-source voltage Vgs of the transistor M5a, that is, the electric potential at the connection point a between the capacities C1a and C2a, reaches a level in the neighborhood of the threshold voltage Vth of the transistor M5a. Consequently, the gate-to-source voltage Vgs of the transistor M5a is reset so that the gate-to-source voltage Vgs may take the level in the neighborhood of the threshold value Vth when the video signal video is the video voltage in the blanking period. This state is illustrated in FIG. 4. Hereinafter the period is referred to as a "Vth reset period." Also in the Vth reset period, because the transistor M6a is OFF, the drive current Id of the transistor M5a is not supplied to the signal line of the current signal data.

Next, in the period of a step S3, which is equivalent to the period from the time t4 to the time t5 in FIG. 14, the video signal is sampled by the other columns.

Figure 5:
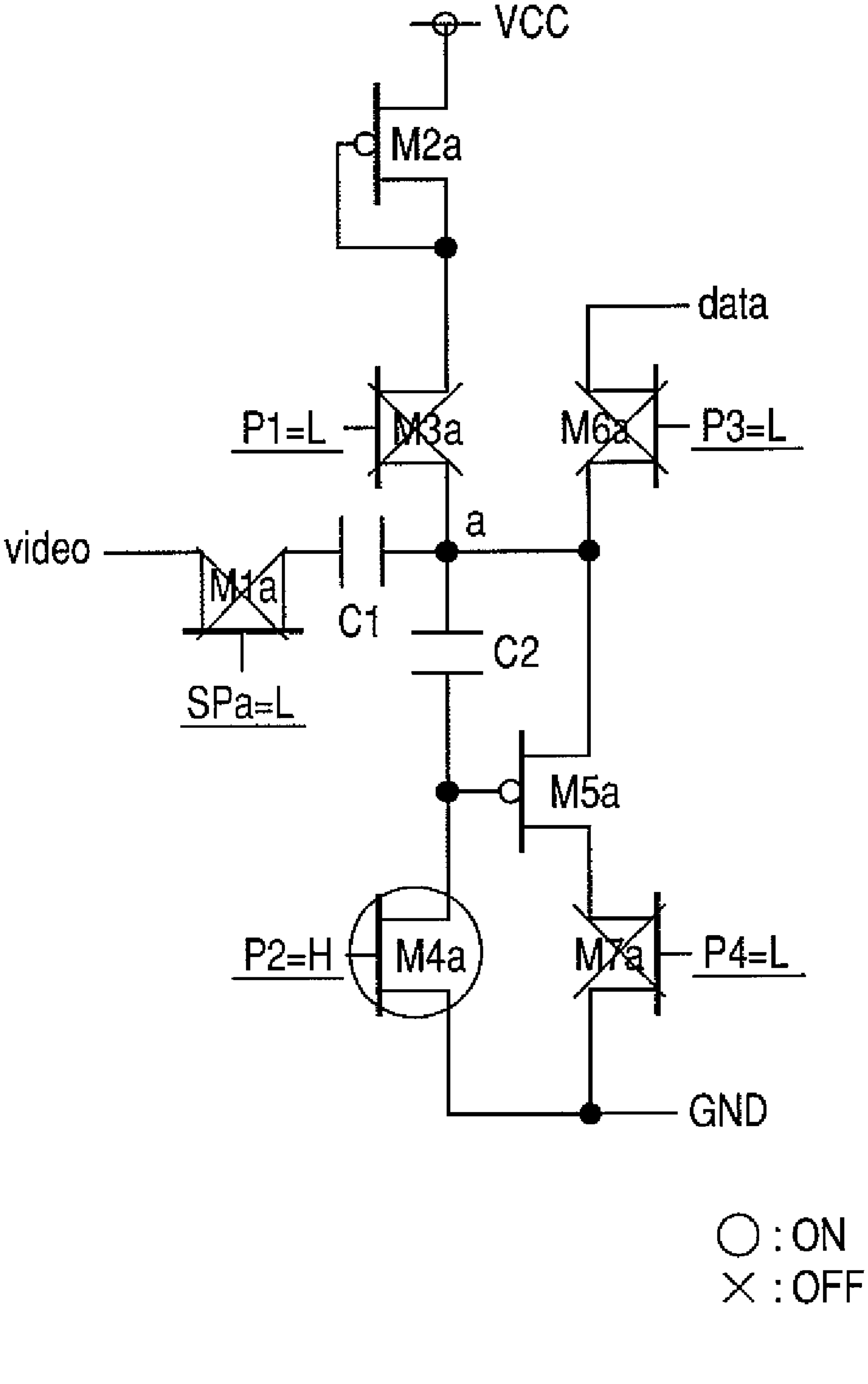
FIG. 5 is a circuit diagram for describing the ON/OFF states of the SW transistors at a step S3 (sampling standby period) in FIG. 2.

In the period at the step S3, the sampling signals SPa and the control signal P4 change to the L levels, and the transistors M1a and M7a turn OFF. Consequently, because the transistor M1a is OFF, the signal input terminal is opened, and the supply of the video signal video is intercepted. On the other hand, because the transistor M7a is OFF, the drain of the transistor M5a is opened, and the transistor M5a becomes a state in which the drain current thereof does not flow. This state is illustrated in FIG. 5.

The electric potential at the connection point a maintains the level in the neighborhood of the threshold value Vth, which level is the one at the time of being reset as above.

Hereinafter the period is referred to as a "sampling standby period." Also in the sampling standby period, because the transistor M6a is OFF, the drive current Id of the transistor M5a is not output to the signal line of the current signal data.

Next, at a step S4, which is equivalent to the period from the time t5 to the time t6 of FIG. 14, the video signal is sampled, and is held by the holding capacitor C2a.

Figure 6:
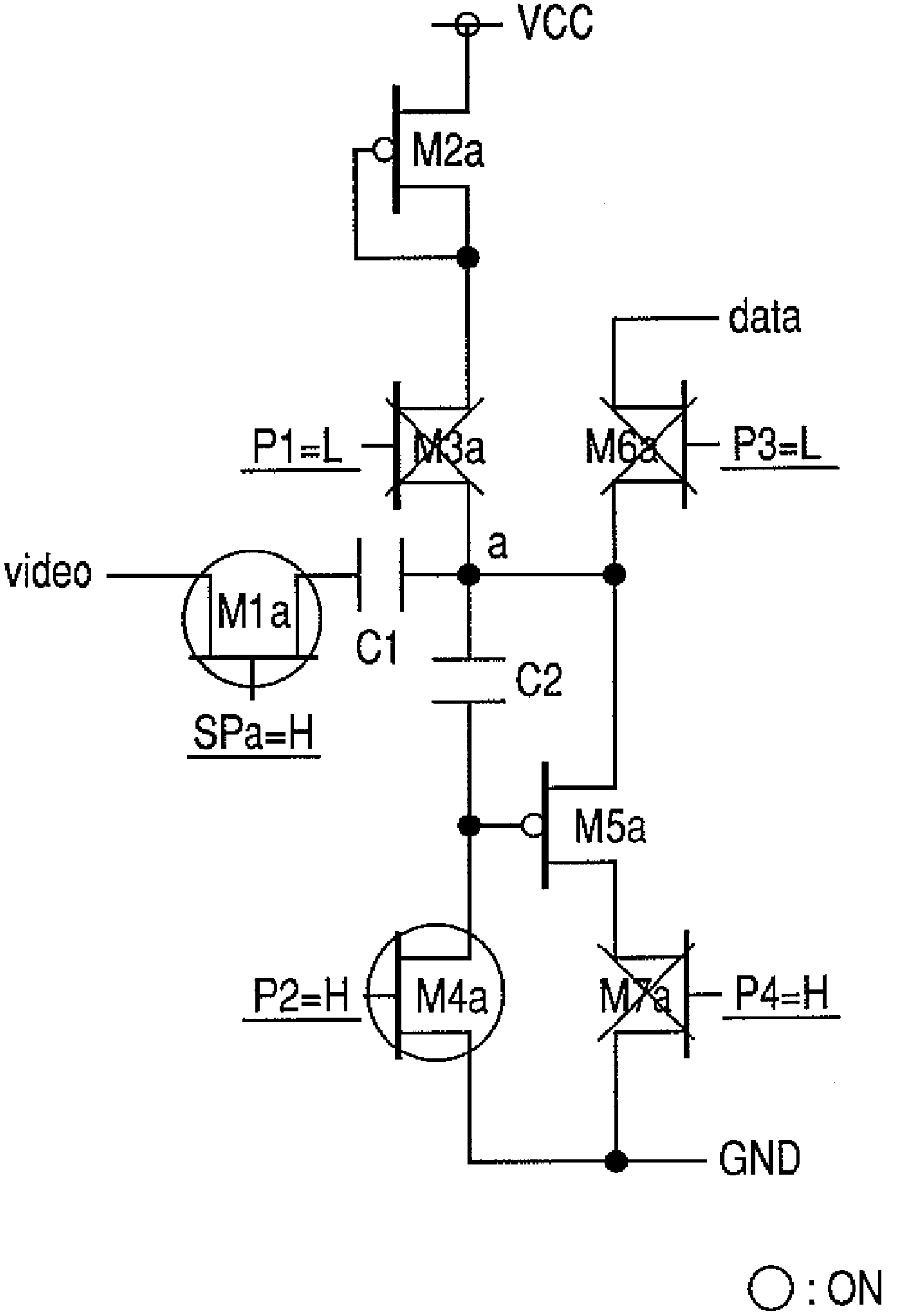
FIG. 6 is a circuit diagram for describing the ON/OFF states of the SW transistors at a step S4 (sampling period) in FIG. 2.

In the period at the step S4, the horizontal sampling signal SPa of a corresponding column in one horizontal scanning period changes to the H level, and the transistor M1a turns ON. Consequently, the video signal video is supplied to the source of the transistor M5a through the transistor M1a and the capacitor C1a. This state is illustrated in FIG. 6.

Because the voltage of the signal input terminal has changed from the voltage during the blanking period to a video signal voltage, the electric potential at the connection point a between the capacities C1a and C2a rises from the value in the neighborhood of the threshold value Vth by a value obtained by performing the capacitor division of a voltage change at the input terminal by the capacities C1a and C2a. The gate-to-source voltage Vgs of the transistor M5a becomes the voltage equal to the threshold voltage Vth added by (the capacitor division voltage of) the input signal voltage according to the voltage rise at the connection point a from the value in the neighborhood of the threshold value Vth.

In such a way, the video voltage of the video signal video at the corresponding column is sampled through the capacities C1a and C2a. Hereinafter this period is referred to as a "sampling period." Also in the sampling period, because the transistor M6a is OFF, the drive current Id of the transistor M5a is not output to the signal line of the current signal data.

Next, at a step S5, which is equivalent to the period from the time t6 to the time t7 in FIG. 14, the column current generation circuit 1 stands by until the sampling of all the columns has been completed.

Figure 7:
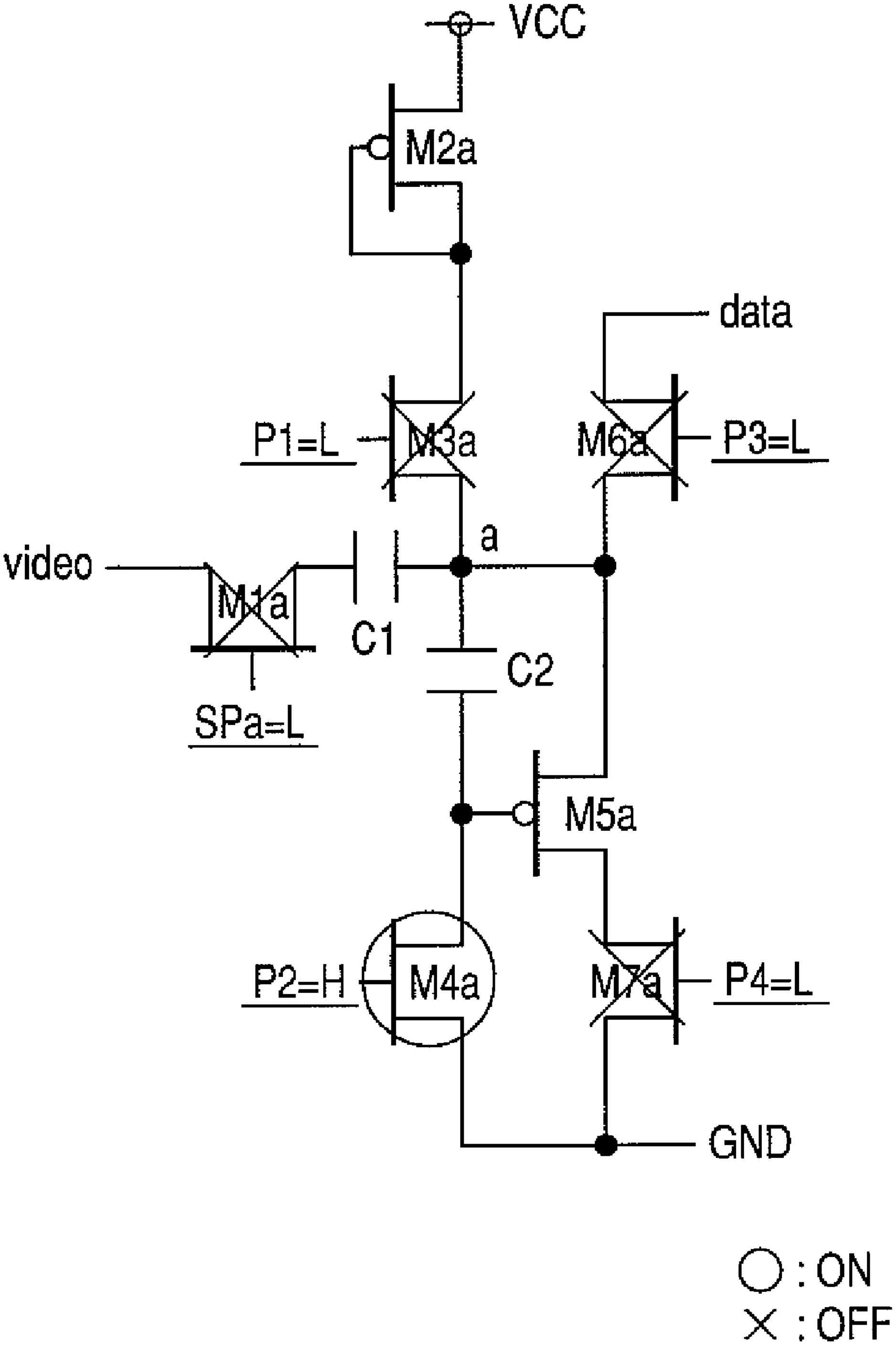
FIG. 7 is a circuit diagram for describing the ON/OFF states of the SW transistors at a step S5 (current hold period) in FIG. 2.

In the period at the step S5, the sampling signal SPa changes to the L level, and the transistor M1a turns OFF to make the signal input terminal an opened state. Thereby, the gate-to-source voltage Vgs of the transistor M5a corresponding to the video voltage of the video signal video sampled as above is maintained, and the drive current Id caused by the gate-to-source voltage Vgs of the transistor M5a is held in the circuit. This state is illustrated in FIG. 7. Hereinafter this period is referred to as a "current hold period." Also in the current hold period, because the transistor M6*a* is OFF, the drive current Id of the transistor M5*a* is not output to the signal line of the current signal data.

Next, at a step S6, which is equivalent to the period from the time t7 to the time t13 in FIG. 14, the current signal is output.

Figure 8:
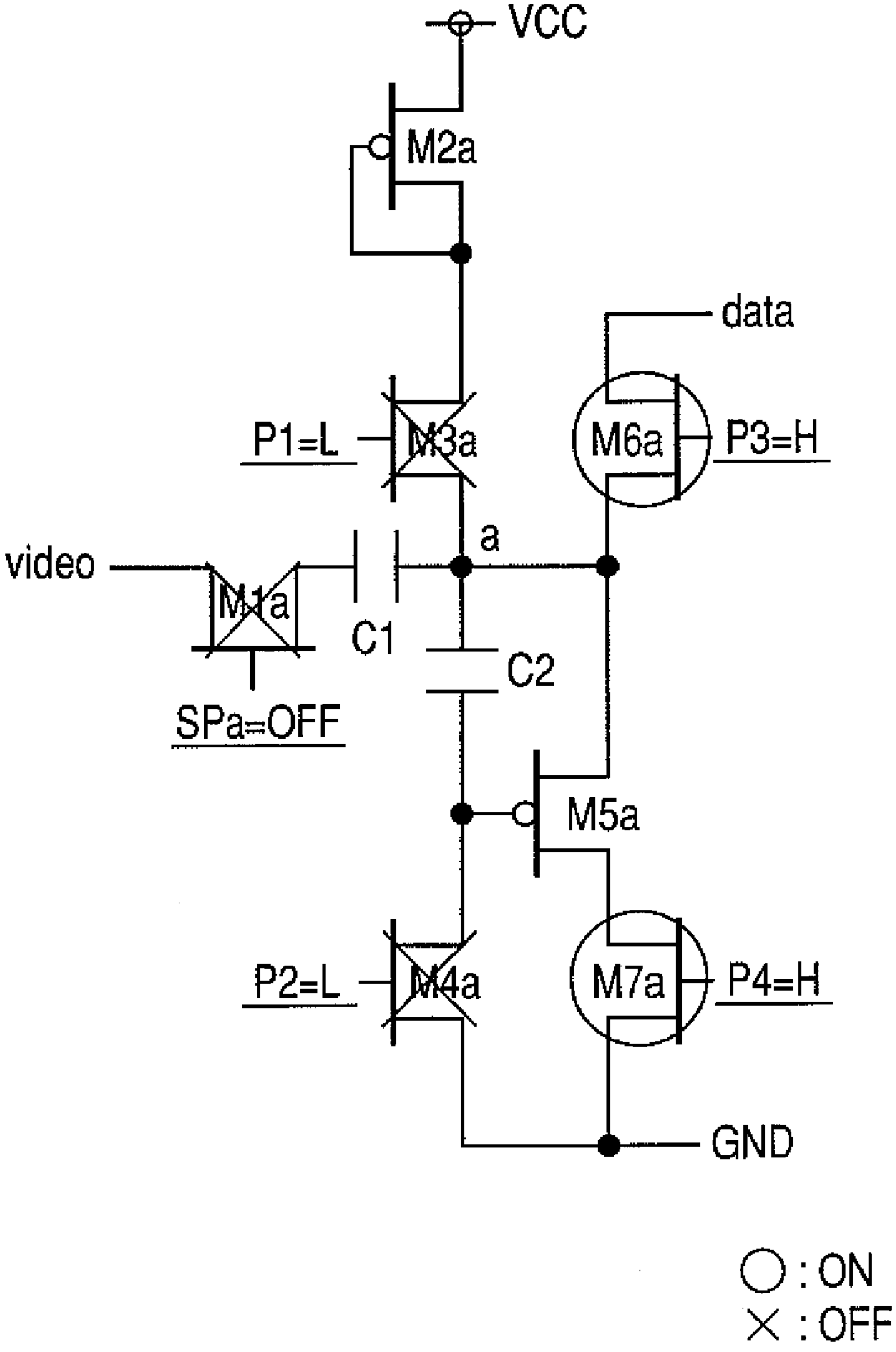
FIG. 8 is a circuit diagram for describing the ON/OFF states of the SW transistors at a step S6 (current output period) in FIG. 2.

In the period at the step S6, the control signal P2 changes to the L level, and the transistors M6*a* and M7*a* change to the H levels. Then, the transistors M4*a*, M6*a*, and M7*a* turn OFF, ON, and ON, respectively. Thereby, the gate of the transistor M5*a* is separated from the ground potential GND, and the drain thereof is in turn connected to the ground electric potential GND. This state is illustrated in FIG. 8.

Because the gate is separated from the ground electric potential GND, the voltage of the capacitor C2*a* is maintained to the gate-to-source voltage Vgs determined at the step S4, and the drive current Id is generated between the source and the drain of the transistor M5*a* according to the gate-to-source voltage Vgs. The drive current Id is expressed as follows: $Id=\beta\times(Vgs-Vth)^2$ (β: drive coefficient). Because the gate-to-source voltage Vgs is the one equal to the threshold value Vth added by the signal voltage subjected to the capacitor division, the variations of the threshold values Vth is cancelled in the drive current Id, and consequently a current according to the signal voltage is generated. The drive current Id of the transistor M5*a* is output from the source side to the signal line of the current signal data through the transistor M6*a*.

Hereinafter this period is referred to as a "current output period." The current output period is maintained until the next horizontal scanning period ends. In the next horizontal scanning period, the sampling signal SPb changes to the H level, and the transistor M1*b* turns ON. Then, each of the operations in the pre-charging period, the Vth reset period, the sampling standby period, the sampling period, the current hold period, and the current output period is performed on the transistor M5*b* side similarly to on the transistor M5*a* side.

As described above, the present exemplary embodiment uses PMOS transistors, which have small characteristic variations as the current drive transistors in the column current generation circuit 1. Moreover, because the present exemplary embodiment operates the input video signal into the column current generation circuit 1 in positive polarity similarly in the configuration of the conventional NMOS drive current transistors, the present exemplary embodiment programs the currents on the source sides of the PMOS drive current transistors. Furthermore, the present exemplary embodiment is adapted to be able to configure the SW transistors in the column current generation circuit 1 using NMOS transistors, which have fewer leaks, similarly in the configuration of the conventional NMOS drive transistors.

By this configuration, the present exemplary embodiment turns on the transistor M1*a* to supply the video signal video to the gate of the transistor M5*a* through the holding capacities C1*a* and C2*a*, and turns on the transistor M3*a* in the state in which the transistor M5*a* is diode-connected to supply the current from the power source voltage VCC. Next, the present exemplary embodiment turns off the transistor M3*a* to intercept the supply of the current, and thereby resets the capacities C1*a* and C2*a* so that the gate voltage of the transistor M5*a* may become the threshold voltage Vth. Next, the present exemplary embodiment turns off the transistor M7*a* to intercept the current path between the drain of the transistor M5*a* and the ground potential GND, and in this state, the present exemplary embodiment turns on the transistor M5*a* to supply the video signal to the gate of the transistor M5*a* through the capacities C1*a* and C2*a*. Next, the present exemplary embodiment turns on the transistor M6*a* to form a current path between the transistor M5*a* and the signal line data, and outputs the current generated between the source and the drain of the transistor M5*a* from the source side to the signal line data.

Consequently, according to the present exemplary embodiment, the current drive transistor are composed of the PMOS transistors, which have smaller characteristic variations, and the circuit configuration is constructed so as to be positive polarity input and positive polarity output. Consequently, the present exemplary embodiment can suppress the changes of the drive current Id, and can decrease the vertical line noises to improve the image quality.

Second Exemplary Embodiment

The present exemplary embodiment is an example of using the display apparatus described above into electric equipment.

Figure 11:
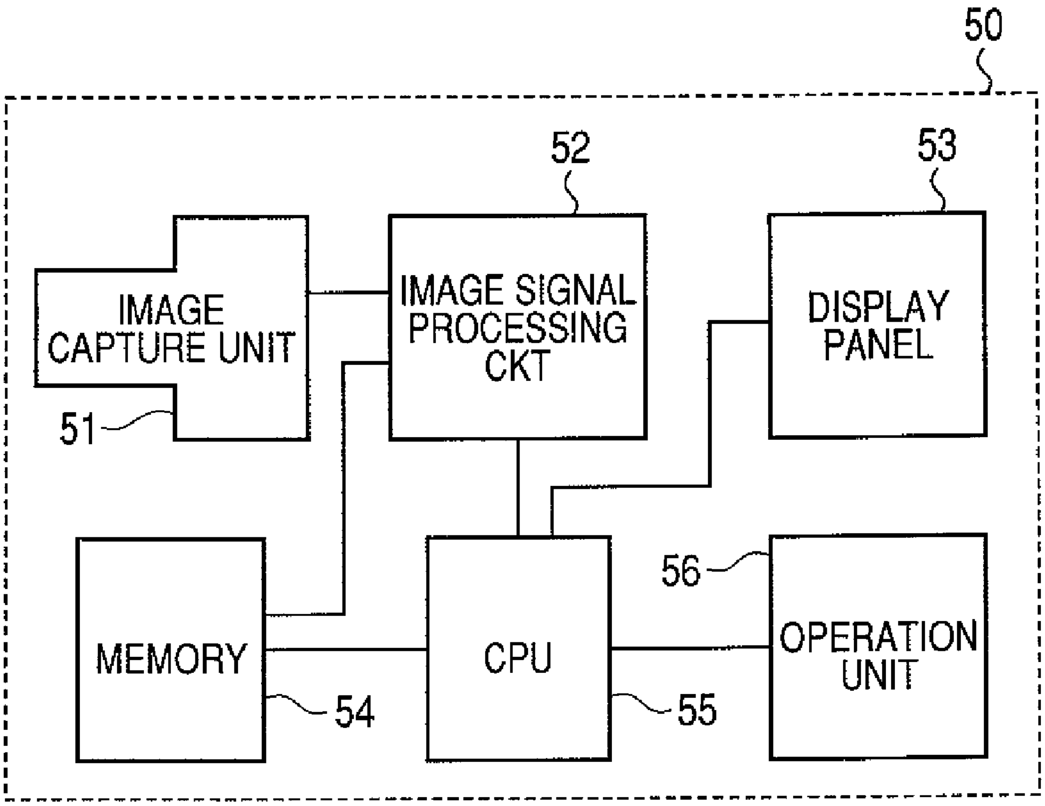
FIG. 11 is a block diagram illustrating the whole configuration of a digital still camera system using a display apparatus according to a second exemplary embodiment of the present invention.

FIG. 11 is a block diagram of an example of a digital still camera system of the present exemplary embodiment. The figure illustrates a digital still camera system 50, an image capture unit 51, an image signal processing circuit 52, a display panel 53, a memory 54, a CPU 55, and an operation unit 56.

In FIG. 11, an image photographed by the image capture unit 51 or an image recorded in the memory 54 is subjected to the signal processing by the image signal processing circuit 52 to be able to be seen on the display panel 53. The CPU 55 controls the image capture unit 51, the memory 54, the image signal processing circuit 52, and the like based on an input from the operation unit 56 to perform photographing, recording, reproducing, and display that are suitable to a situation. Moreover, the display panel 53 can be used as a display unit of various kinds of electric equipment besides.

Although the display apparatus using the EL elements have been described as examples in the exemplary embodiments mentioned above, the present invention is not limited to the display apparatus. For example, the present invention can be applied to a current drive type display apparatus, such as a plasma display panel (PDP) and a field emission display (FED).

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-181668, filed Jun. 30, 2006 which is hereby incorporated by reference herein in its entirety.

What is claimed is:

1. A voltage-current converting method for converting an input voltage signal into a current signal and outputting the current signal, the method comprising steps of:

connecting a source of a PMOS transistor to a first power source, connecting the source of the PMOS transistor to a signal input terminal via a coupling capacitor, and connecting a gate of the PMOS transistor and a drain of the PMOS transistor to a second power source to flow a current between the source of the PMOS transistor and the drain of the PMOS transistor while a constant voltage is applied to the signal input terminal, thereby charging a holding capacitor connected between the gate of the PMOS transistor and the source of the PMOS transistor;

disconnecting the source of the PMOS transistor from the first power source, thereby discharging the holding capacitor through the PMOS transistor;

disconnecting the drain of the PMOS transistor from the second power source, supplying the input voltage signal from the signal input terminal to the holding capacitor via the coupling capacitor, and connecting or continuing to connect the gate of the PMOS transistor to the second power source; and disconnecting the coupling capacitor from the signal input terminal, disconnecting the gate of the PMOS transistor from the second power source, connecting the drain of the PMOS transistor to the second power source, and connecting the source of the PMOS transistor to an output terminal, thereby outputting the current signal.

2. A voltage-current converting circuit for converting an input voltage signal into a current signal and outputting the current signal, the circuit comprising:

a PMOS transistor;

a coupling capacitor connected between a signal input terminal and a source of the PMOS transistor;

a holding capacitor connected between a gate of the PMOS transistor and the source of the PMOS transistor;

a first switching element the signal input terminal, which receives the input voltage signal, to the coupling capacitor;

a second switching element connecting the source of the PMOS transistor to a first power source;

a third switching element connecting a drain of the PMOS transistor to a second power source;

a fourth switching element connecting the source of the PMOS transistor to an output terminal, which outputs the current signal; and a fifth switching element directly connecting the gate of the PMOS transistor to the second power source.

3. The voltage-current converting circuit according to claim 2, wherein each of the first switching element to the fifth switching element includes an NMOS transistor.

4. The voltage-current converting circuit according to claim 2, further comprising a diode-connected transistor connected between the second switching element and the first power source.

5. An active matrix type display apparatus comprising:

a plurality of display elements to be driven according to input currents, the display elements arranged in a two-dimensional array;

a plurality of pixel circuits supplying the currents to the plurality of display elements to drive the display elements;

signal lines for supplying the currents to the plurality of pixel circuits via every column of the two-dimensional array; and column current generation circuits outputting the currents to the signal lines according to input voltage signals, wherein each of the column current generation circuits includes:

a PMOS transistor, a coupling capacitor connected between a voltage signal input terminal and a source of the PMOS transistor, a holding capacitor connected between a gate of the PMOS transistor and the source of the PMOS transistor;

a first switching element connecting the voltage signal input terminal to the coupling capacitor;

a second switching element connecting the source of the PMOS transistor to a first power source;

a third switching element connecting a drain of the PMOS transistor to a second power source;

a fourth switching element connecting the source of the PMOS transistor to one of the signal lines; and a fifth switching element directly connecting the gate of the PMOS transistor to the second power source.

6. The active matrix type display apparatus according to claim 5, wherein a voltage signal common to all the columns is supplied to the voltage signal input terminals of the column current generation circuits, and the first switching elements samples the voltage signal common to all the columns by time-sharing.

7. The active matrix type display apparatus according to claim 5, wherein the display elements are electroluminescence elements.

* * * * *